United States Patent
Das et al.

(10) Patent No.: US 7,315,905 B2
(45) Date of Patent: Jan. 1, 2008

(54) SOFTWARE CONTROLLED HARD RESET OF MASTERING IPS

(75) Inventors: Subrangshu Kumar Das, West Bengal (IN); Ashutosh Tiwari, Chattisgargh (IN); Subash Chandar Govindarajan, Tamil Nadu (IN)

(73) Assignee: Texas Instruments Incorporated, Dallas, TX (US)

( * ) Notice: Subject to any disclaimer, the term of this patent is extended or adjusted under 35 U.S.C. 154(b) by 450 days.

(21) Appl. No.: 11/034,579

(22) Filed: Jan. 13, 2005

(65) Prior Publication Data

US 2005/0182859 A1    Aug. 18, 2005

Related U.S. Application Data

(60) Provisional application No. 60/535,991, filed on Jan. 13, 2004.

(51) Int. Cl.
  *G06F 13/10* (2006.01)
  *G06F 1/24* (2006.01)

(52) U.S. Cl. .................. 710/14; 710/8; 713/1

(58) Field of Classification Search ............ None
See application file for complete search history.

(56) References Cited

U.S. PATENT DOCUMENTS 6,073,253 A * 6/2000 Nordstrom et al. ............ 714/25
6,633,938 B1 * 10/2003 Rowlands et al. .......... 710/240

* cited by examiner

*Primary Examiner*—Ilwoo Park
(74) *Attorney, Agent, or Firm*—Robert D. Marshall, Jr.; W. James Brady; Frederick J. Telecky, Jr.

(57) ABSTRACT

A system-on-chip integrated circuit includes a peripheral initialization register has a bit corresponding to each module. Each bit indicates a normal mode or a reset mode for the corresponding module. A direct memory access unit can receive, prioritize and queue date movement transactions between modules and can read from or write to the peripheral initialization register. A peripheral interface unit prevents a write to the peripheral initialization register changing a module from reset mode to normal mode while there is an uncompleted data movement transaction involving that module. A false acknowledge circuit for each module supplies an acknowledge signal in response to a received command if the module is in reset mode.

5 Claims, 3 Drawing Sheets

US 7,315,905 B2

SOFTWARE CONTROLLED HARD RESET OF MASTERING IPS

CLAIM OF PRIORITY

This application claims priority under 35 U.S.C. 119(e)(1) from U.S. Provisional Application 60/535,991 filed Jan. 13, 2004.

TECHNICAL FIELD OF THE INVENTION

The technical field of this invention is a mechanism to selectively reset modules in a system on a chip circuit.

BACKGROUND OF THE INVENTION

This invention concerns system-on-chip (SoC) designs. A SoC includes all or substantially all of the electronics of a useful consumer product in a single integrated circuit. Advances in microelectronics enables integration of all electronic components of a system on a single integrated circuit or chip. A SoC generally includes a variety of circuits types such as: a microprocessor based central processing unit (CPU) including a direct memory access (DMA) unit for control of data movement without direct CPU intervention; various peripheral interfaces such as for input devices and output devices; and co-processors designed for specific data processing tasks that cannot be handled by the CPU. The SoC may include memory such as cache memory for the CPU, data buffers within various circuits and non-volatile memory such as read only memory (ROM) or erasable programmable read only memory (EPROM) for program storage for product definition. A SoC may also include larger system memory such as dynamic random access memory (DRAM) or rely upon an external commodity memory integrated circuit.

Due to the variety of circuits required, current SoC designs are often assembled from circuit modules produced by different design teams. Often design of circuit modules is a specialized task and so expertise in one design of one circuit module does not transfer to another circuit module. Even if all the circuit modules are designed by the same design team, often efficiency concerns require that a previously designed circuit module be used as a whole in a new SoC rather than producing a new module design. The task of the SoC design team is primarily in integrating existing circuit modules into the whole. This process is similar to the task of assembling a multi-integrated system from multiple integrated circuits with some important differences.

This design dynamic has given rise to independent module design companies. These companies sole output is called intellectual property (IP) which are circuit module designs. A semiconductor manufacturer purchases this IP for integration into its SoC products. This IP often involves peripherals that cater to a particular application domain such as audio, video, PCI, I2C, etc. These peripherals interact both with the external world and the DMA system to transfer data between them without intervention from the CPU. These IP modules are often delivered to the SoC manufacturer as completed layout designs without the SoC manufacturer having any capability of altering the IP module.

Quite often IP modules are designed, verified and stressed in an environment that does not truly model all the different system environments both on-chip and off-chip that the IP module will encounter in actual use. An unforeseen stressful real-time scenario can therefore cause the IP module to enter into an erroneous or a fatal state. Generally when this happens to one IP module, the entire system must reset to get around such an issue. A better way to handle this problem would be to use system software to hard reset only the IP module encountering an erroneous condition. This technique is herein referred as soft-reset. Implementing a run-time soft-reset mechanism in a shared and distributed DMA system poses a lot of challenges. On-going transactions might stall because the resetting IP module fails to respond. This, in turn, could lead to a system hang. In addition it is necessary to ensure that the IP module does not encounter any stale transactions once it comes out of soft-reset.

SUMMARY OF THE INVENTION

A system-on-chip integrated circuit includes a peripheral initialization register has a bit corresponding to each module. Each bit indicates a normal mode or a reset mode for the corresponding module. A direct memory access unit can receive, prioritize and queue date movement transactions between modules and can read from or write to the peripheral initialization register. The direct memory access unit also generates a pending transaction signal for each module indicating whether the direct memory access unit controls an uncompleted data movement transaction for that module. A peripheral interface unit prevents a write to the peripheral initialization register changing a module from reset mode to normal mode while there is an uncompleted data movement transaction involving that module.

A false acknowledge circuit for each module supplies an acknowledge signal in response to a received command if the module is in reset mode. This prevents system hang cause by non-acknowledgement by the inactive module.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
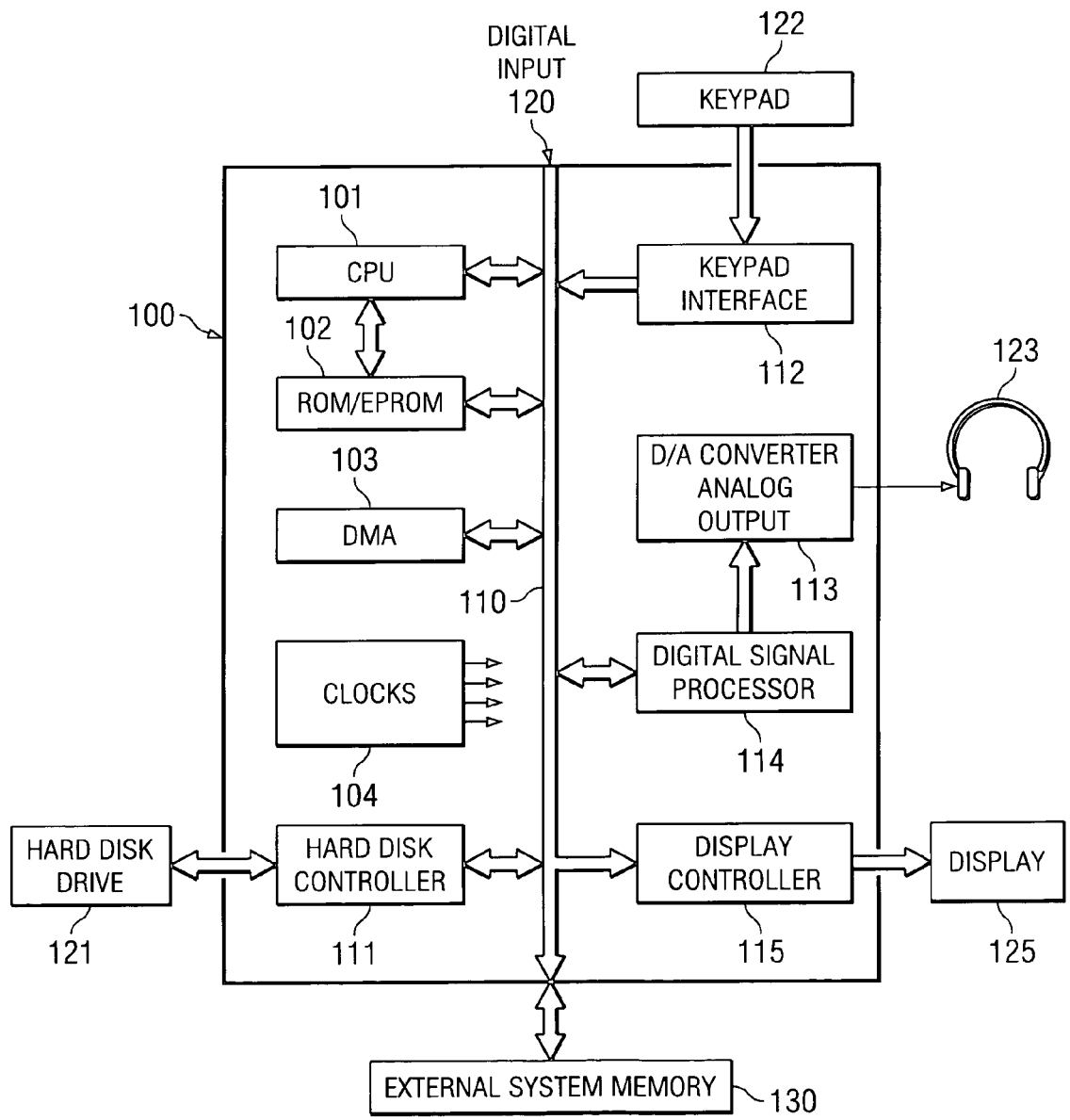
FIG. 1 illustrates a block diagram of an example prior art system-on-chip design implementing a compressed digital music system.

FIG. 1 illustrates a block diagram of a consumer product employing a system-on-chip circuit 100. FIG. 1 illustrates a portable compressed digital music system. This portable compressed digital music system includes system-on-chip integrated circuit 100 and external components hard disk drive 121, keypad 122, headphones 123, display 125 and external memory 130.

The compressed digital music system illustrated in FIG. 1 stores compressed digital music files on hard disk drive 121. These are recalled in proper order, decompressed and presented to the user via headphones 123. System-on-chip 100 includes: core components CPU 101, ROM/EPROM 102, DMA 103 and clocks 104; system bus 110; digital input 120; and peripherals hard disk controller 111, keypad interface 112, D/A converter and analog output 113, digital signal processor 114 and display controller 115. Central processing unit (CPU) 101 acts as the controller of the system giving the system its character. CPU 101 operates according to programs stored in ROM/EPROM 102. Read only memory (ROM) is fixed upon manufacture. Suitable programs in ROM include the user interaction programs, that are how the system responds to inputs from keypad 112 and displays information on display 125, the manner of fetching and controlling files on hard disk drive 121 and the like. Erasable programmable read only memory (EPROM) may be changed following manufacture even in the hand of the consumer in the field. Suitable programs for storage in EPROM include the compressed data decoding routines. As an example, following purchase the consumer may desire to enable the system to be capable of employing compressed digital data formats different from or in addition to the initially enabled formats. The suitable control program is loaded into EPROM from digital input 120 via system bus 110. Thereafter it may be used to decode/decompress the additional data format. A typical system may include both ROM and EPROM.

Direct memory access (DMA) unit 103 controls data movement throughout the whole system. This primarily includes movement of compressed digital music data from hard disk drive 121 to external system memory 130 and to digital signal processor 114. Data movement by DMA 103 is controlled by commands from CPU 101. However, once the commands are transmitted, DMA 103 operates autonomously with intervention by CPU 101.

Clocks 104 generates the clock signals for all portions of the SoC 100. The separate circuits will often require clocks of different frequencies. CPU 101, DMA 102 and digital signal processor 113 will typically require the highest frequency clocks. Hard disk controller 111 will typically require an intermediate frequency clock. Display controller 115 and keypad interface 112 will typically require the lowest frequency clocks.

System bus 110 serves as the backbone of SoC 100. Major data movement within SoC 100 occurs via system bus 110.

Hard drive controller 111 controls data movement to and from hard drive 121. Hard drive controller 111 moves data from hard disk drive 121 to system bus 110 under control of DMA 102. This data movement would enable recall of digital music data from hard drive 121 for decompression and presentation to the user. Hard drive controller 111 moves data from digital input 120 and system bus 110 to hard disk drive 121. This enables loading digital music data from an external source to hard disk drive 121.

Keypad interface 112 mediates user input from keypad 122. Keypad 122 typically includes a plurality of momentary contact key switches for user input. Keypad interface 112 senses the condition of these key switches of keypad 122 and signals CPU 101 of the user input. Keypad interface 112 typically encodes the input key in a code that can be read by CPU 101. Keypad interface 112 may signal a user input by transmitting an interrupt to CPU 101 via an interrupt line (not shown). CPU 101 can then read the input key code and take appropriate action.

Digital to analog (D/A) converter and analog output 112 receives the decompressed digital music data from digital signal processor 114. This provides an analog signal to headphones 123 for listening by the user. Digital signal processor 114 receives the compressed digital music data and decompresses this data. There are several known digital music compression techniques. These typically employ similar algorithms. It is therefore possible that digital signal processor 114 can be programmed to decompress music data according to a selected one of plural compression techniques.

Display controller 115 controls the display shown to the user via display 125. Display controller 115 receives data from CPU 101 via system bus 110 to control the display. Display 125 is typically a multiline liquid crystal display (LCD). This display typically shows the title of the currently playing song. It may also be used to aid in the user specifying playlists and the like.

External system memory 130 provides the major volatile data storage for the system. This may include the machine state as controlled by CPU 101. Typically data is recalled from hard disk drive 121 and buffered in external system memory 130 before decompression by digital signal processor 114. External system memory 130 may also be used to store intermediate results of the decompression. External system memory 130 is typically commodity DRAM or synchronous DRAM.

Figure 2:
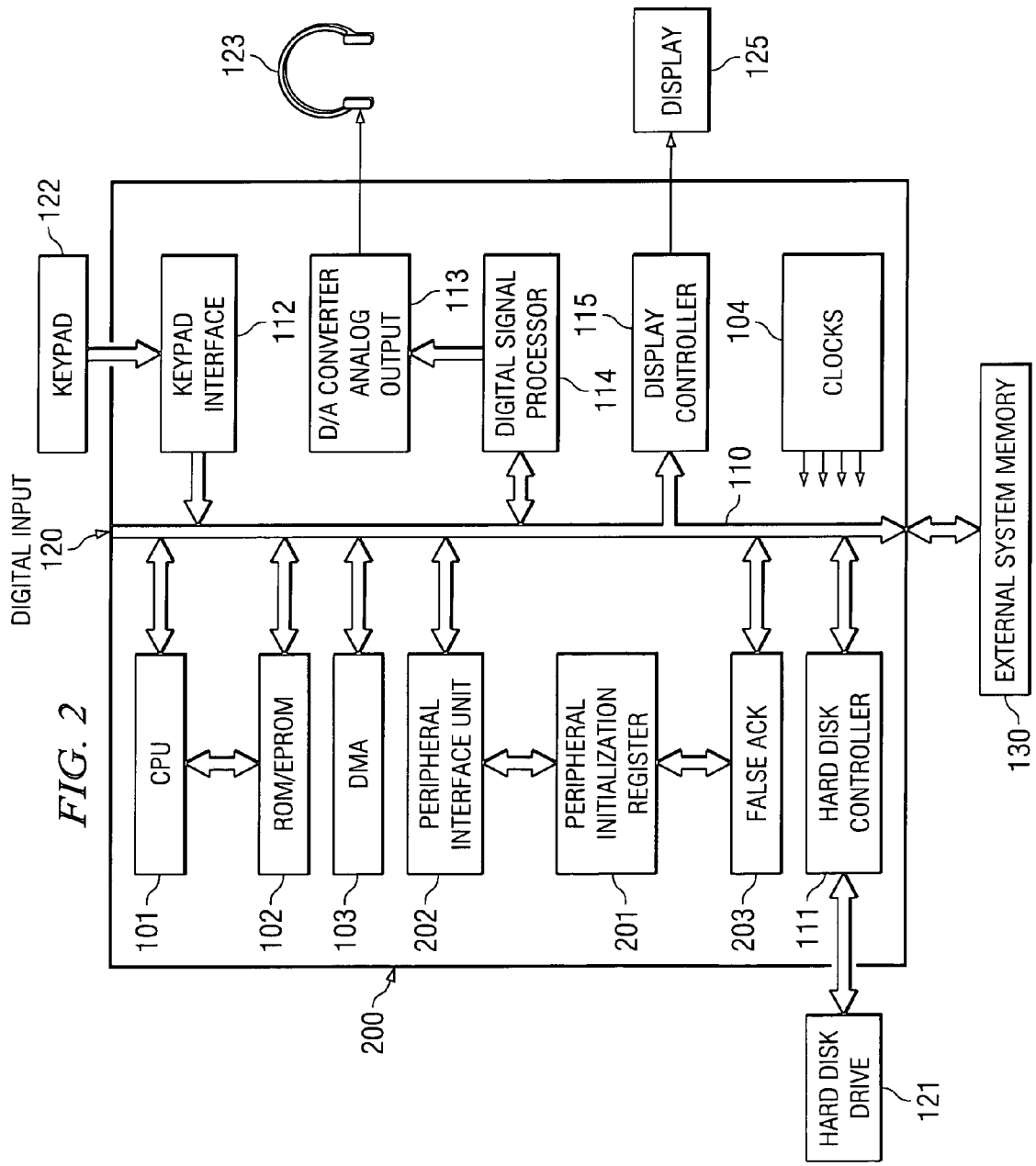
FIG. 2 illustrates a block diagram of an example system-on-chip design according to this invention.

FIG. 2 illustrates the block diagram of SoC 200 constructed according to this invention. SoC 200 includes most of the parts previously included in SoC 100 illustrated in FIG. 1. SoC 200 also includes peripheral initialization register 201, and false acknowledge unit 203. Peripheral initialization (PERINIT) register 201 is a memory mapped register readable and writeable via system bus 110. Peripheral initialization register 201 has one bit corresponding to each controlled module. These bits associated with the modules control reset of the controlled module (described below in conjunction with FIG. 3) and generation of acknowledge signals by false acknowledge unit 203.

Figure 3:
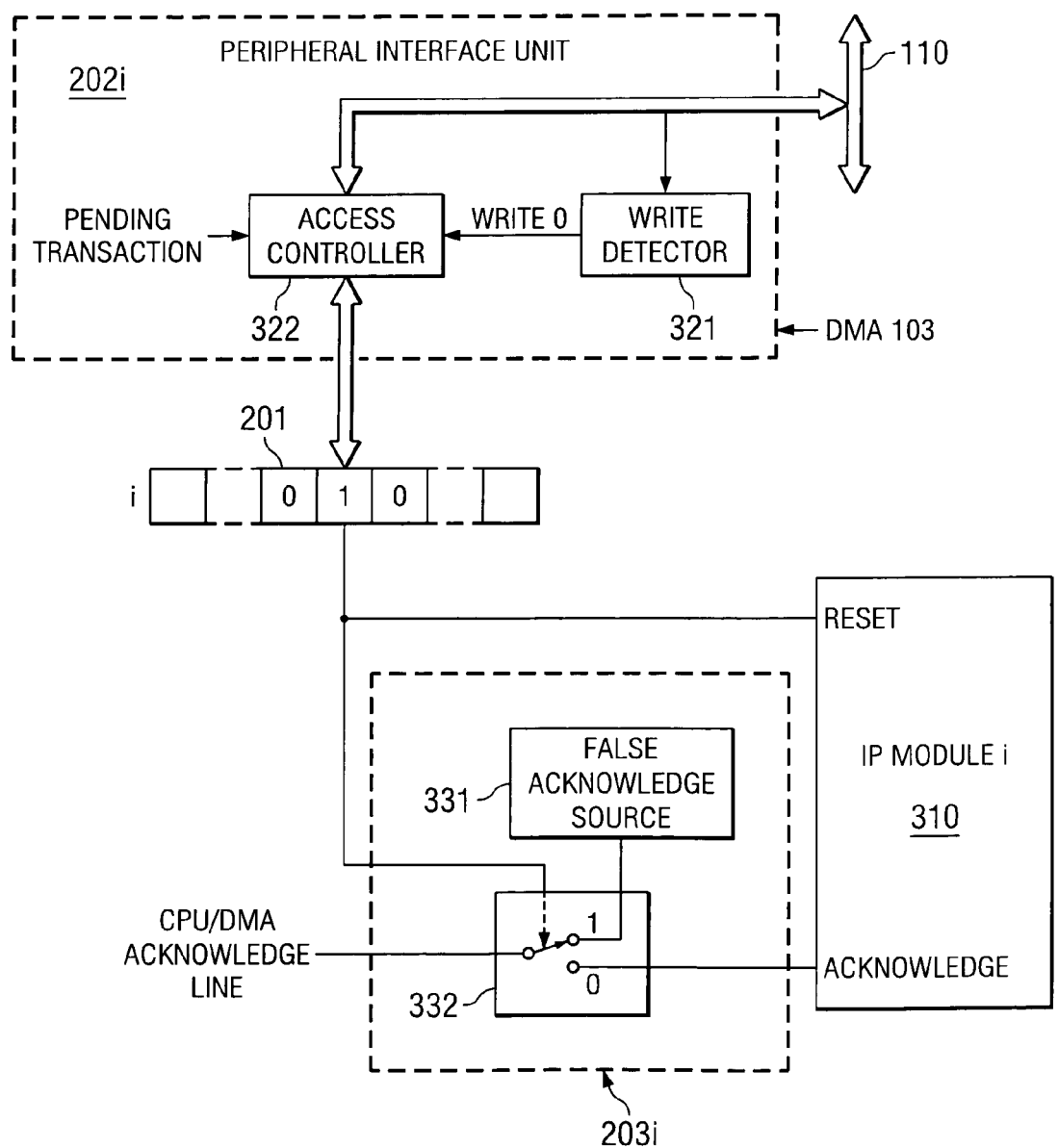
FIG. 3 illustrates a block diagram of a detail of the peripheral initialization register and auxiliary hardware illustrated in FIG. 2 implementing this invention.

FIG. 3 illustrates a detailed block diagram of the circuits for control of the i-th IP module 310. PERINIT register 201 may be loaded by CPU 101 or by DMA 103 at a suitable memory address. Each bit of PERINT register 201 indicates whether the corresponding IP module is in hardware reset mode. Preferably each bit of PERINIT register 201 is user writeable/readable. Peripheral interface unit 202 controls writes to PERINIT register 201 as will be explained below. False acknowledge unit 203 provides a simulated acknowledge signal for transactions directed to IP module 310 when in reset mode.

The reset input of IP module 310 is responsive to the corresponding i-th bit of PERINIT register 201. The i-th bit of PERINIT register 201 commands reset of IP module 310 via its reset input when it has a particular digital state. In this example, if the i-th bit of PERINIT 201 is 0, then no reset command is applied to IP module 310. If the i-th bit of PERINIT 201 is 1, then a reset command is applied to the reset input of IP module 310. Thus writing a 1 to a bit of PERINIT register 201 resets the corresponding IP module.

The i-th peripheral interface unit 202i corresponding to the i-th IP module 310 ensures that IP module 310 does not encounter any stale transactions. Peripheral interface unit 202i prevents bringing IP module 310 out of reset mode until all pending transactions are complete. As previously noted, PERINIT register 201 is preferably memory mapped and thus can be read from or written to at a corresponding memory address on system bus 110. Peripheral interface unit 202i sits between system bus 110 and PERINIT register 201 to control access to this register. Writing a 0 to a bit will not modify the actual internal value stored in PERINIT register 201 until all pending transfers are finished. Write detector 321 is connected to system bus 110 and determines if a transaction is directed to the corresponding IP module 310 via its address. Write detector 321 also determines if this transaction is a write operation. System bus 110 will typically include address lines, data lines and control lines. The transaction address is driven on the address lines via the bus system device, such as CPU 201 or DMA 203. Data is exchanged via the data lines. System bus 110 will typically have one control line whose digital state indicates whether the transaction is a read operation or a write operation. Write detector 321 is responsive to this control line. Write detector 321 also determines whether the write data is 1 or 0.

Access controller 322 controls read and write access to PERINIT register 201. Access controller 322 operates as follows. If the access is a read access, then access controller 322 permits the access to PERINIT register 201. The data is recalled from PERINIT register 201 and supplied on the data lines of system bus 110. If the access is a write access, then access controller 322 operates differently depending on whether it is a write of a 0 to enter normal mode and whether there are any pending transactions for the corresponding IP module 310. If the write is a 1, thus requestion entry into the reset mode, access controller 322 permits the write operation. Data within PERINIT register 201 is immediately changed and IP module 310 is immediately placed in reset mode. If the write is a 0 as indicated by write detector 321, thus requesting exit from reset mode into normal mode, then access controller 322 defers the write operation until the are no longer any pending transactions for the corresponding IP module 310. DMA 103 will typically control plural pending transactions and order their execution based upon a priority scheme. Thus at any time DNA 103 may have one or more transactions pending for any of the IP modules. DMA 103 transmits a pending transaction signal to access controller 322 indicating whether it has any transactions pending for the corresponding IP module 310. Once there are no transactions pending for the corresponding IP module 310, then access controller 322 permits the write to PERINIT register 201.

In the case of a write of 0 when there are pending transactions, the action of access controller 202 causes PERINIT register 201 to remain 1. A read of this bit during such a time would obtain a value of 1, indicating that the corresponding IP module 310 is held at reset. This reflects the true status of IP module 310. This allows the user to poll this bit to determine whether the corresponding IP module 310 has come out of reset. Access controller 322 thus does not permit IP module 310 to encounter stale transactions generated while in reset mode.

FIG. 3 illustrates an example implementation of a false acknowledge for IP module 310. It is typical for IP module 310 to acknowledge commands from a bus master device such as CPU 201 or DMA 203. This acknowledge response enables the bus master device to be assured that the command was received by the target module. To this end, each IP module 310 includes some mechanism to generate an acknowledge response. This is illustrated schematically in FIG. 3 as the Acknowledge I/O of IP module 310. However, those skilled in the art would recognize there are many feasible acknowledge response mechanisms. The bus master would typically go into a recover mode if it fails to receive the expected acknowledge signal. This may involve extensive waits and may cause other processes not directly related to the non-acknowledging IP module to fail.

FIG. 3 illustrates i-th false acknowledge unit 203i corresponding to i-th IP module 310 generating the false acknowledge signal. In this example of the invention, the IP module is in reset mode and therefore disabled when the corresponding bit in PERINIT register 201 is 1. The IP module cannot generate any acknowledge response in such as state. The false acknowledge of this invention prevents this acknowledge failure from interfering with other unrelated processes. This false acknowledge block is between the IP module and the shared DMA system. False acknowledge source 331 is capable of generating an acknowledge signal in the same manner as the corresponding IP module 310. Switch 332 receives the corresponding bit from PERINIT register 201. When this bit indicates that IP module 301 is 0 indicating normal mode, switch 332 connects the acknowledge I/O of IP module 310 to the acknowledge line of CPU 201 or DMA 203. In this state, IP module 310 is in normal mode and supplies its own acknowledge response. When the corresponding bit is 1 indicating that IP module 301 is in reset mode, switch 312 connects false acknowledge source 331 to the acknowledge line of CPU 201 or DMA 203. In this state, IP module 310 is in reset mode and false acknowledge source 331 supplies a simulated acknowledge response. Thus when IP module 310 is in normal mode, false acknowledge source 331 remains passive and switch 312 allows the data-flow between IP module 310 and the DMA system without intervention. When IP module 310 is in reset mode, false acknowledge source 331 actively responds back to prevent stalling of any on-going transactions from the just reset module. Note at such a stage because CPU 210 or DMA 203 has set the bit in PERINIT register 201 to reset the IP module, transferring the correct data is not of much concern. The prime concern is ensuring no system stall occurs.

This invention is advantageous for the following reasons:

1) Most soft-reset solutions would involve some sort of modifications inside the IP modules. This invention avoids this-requirement.

2) This invention ensures clean re-start of the IP module once it is brought out of reset while prior solutions do not guarantee clean re-start.

3) This invention permits restarting IP module on a selective basis without requiring reset of the entire device.

4) This invention allows the user to poll the reset bits in a register to determine the true status (reset state/normal state) of the IP module.

What is claimed is:

1. A system-on-chip integrated circuit comprising:

at least one digital module having a reset input permitting said digital module to be placed in either a normal mode or in a reset mode;

a peripheral initialization register having a bit corresponding to each of said at least one digital module, each bit storing either a first digital state indicating a normal mode for the corresponding digital module or a second opposite digital state indicating a reset mode for the corresponding digital module, each bit connected to said reset input of said corresponding digital module;

a direct memory access unit connected to each of said at least one digital module and to said peripheral initialization register, said direct memory access unit operable to receive, prioritize and queue date movement transactions between said digital modules, generate a pending transaction signal for each digital module indicating whether said direct memory access unit controls an uncompleted data movement transaction involving said digital module, and read from and write to said peripheral initialization register; and a peripheral interface unit disposed between said direct memory access unit and said peripheral initialization register, said peripheral interface unit operable to prevents a write to said peripheral initialization register changing a digital module from said reset mode to said normal mode while said direct memory access unit indicates an uncompleted data movement transaction involving said digital module.

2. The system-on-chip integrated circuit of claim 1 wherein:
said first digital state is 0 and said second digital state is 1.

3. A system-on-chip integrated circuit comprising:
at least one digital module having a reset input permitting said digital module to be placed in either a normal mode or in a reset mode, at least one of said at least one digital module including an acknowledge output supplying an acknowledge output in response to a received command;
a peripheral initialization register having a bit corresponding to each of said at least one digital module, each bit storing either a first digital state indicating a normal mode for the corresponding digital module or a second opposite digital state indicating a reset mode for the corresponding digital module, each bit connected to said reset input of said corresponding digital module; and
a false acknowledge circuit corresponding to each of said at least one digital module, each false acknowledge circuit receiving said corresponding bit of said peripheral enable register, said false acknowledge circuit supplying an acknowledge signal in response to a received command if said corresponding bit of said peripheral enable register indicates said reset mode and not supplying an acknowledge signal in response to a received command if said corresponding bit of said peripheral enable register indicates said normal mode.

4. The system-on-chip integrated circuit of claim 3, further comprising:
an acknowledge line for receiving an acknowledge signal corresponding to each digital module; and
said false acknowledge circuit includes
a false acknowledge source capable of generating said acknowledge signal at an acknowledge output in response to said command, and
a switch receiving said bit of said peripheral enable register, said switch having a common connection to said acknowledge line, a first selected connection connected to said acknowledge output of said digital module and a second selected connection connected to said acknowledge output of said false acknowledge source, said switch connecting said common connection to said first selected connection if said corresponding bit of said peripheral enable register indicates said normal mode and connecting said common connection to said second selected connection if said corresponding bit of said peripheral enable register indicates said reset mode.

5. The system-on-chip integrated circuit of claim 3 wherein:
said first digital state is 0 and said second digital state is 1.

* * * * *